Figure 1:
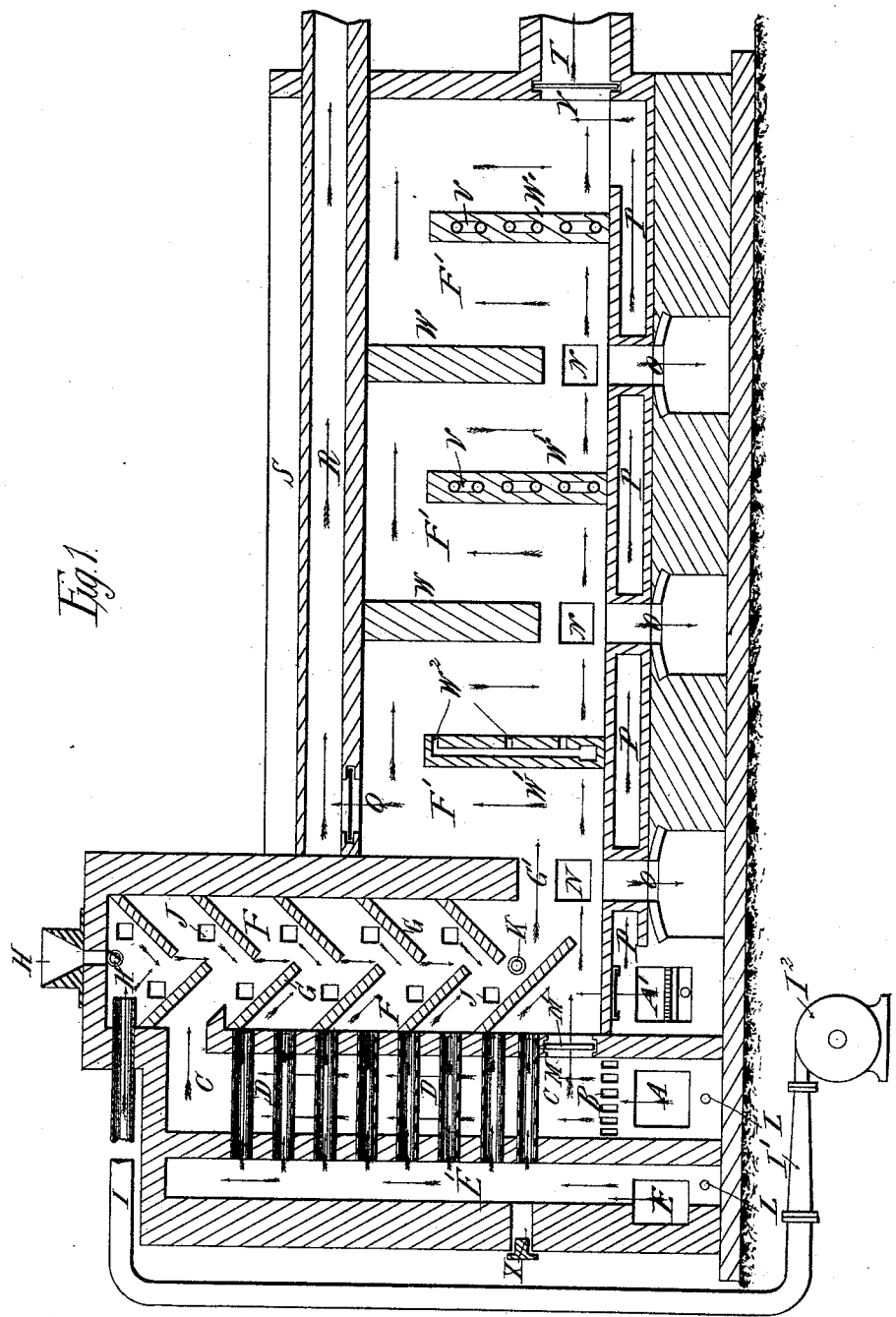

(No Model.) 2 Sheets—Sheet 1.

H. HUTCHINSON.
FURNACE FOR CALCINING ORES.

No. 414,051. Patented Oct. 29, 1889.

Witnesses
F. J. Brougham
W. Cross

Inventor
Henry Hutchinson (No Model.) 2 Sheets—Sheet 2.
H. HUTCHINSON.
FURNACE FOR CALCINING ORES.
No. 414,051. Patented Oct. 29, 1889.
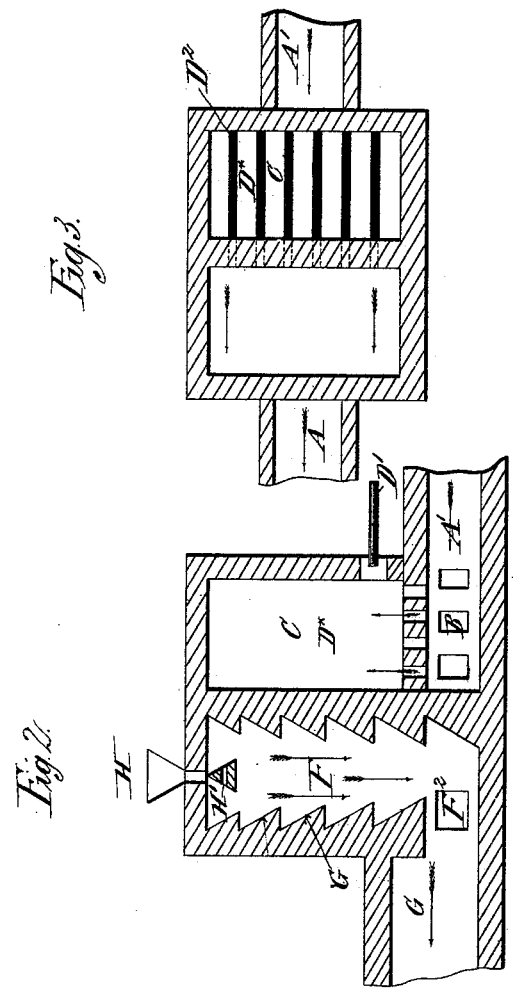

UNITED STATES PATENT OFFICE.

HENRY HUTCHINSON, OF LONDON, ENGLAND.

FURNACE FOR CALCINING ORES.

SPECIFICATION forming part of Letters Patent No. 414,051, dated October 29, 1889.

Application filed March 16, 1889. Serial No. 303,535. (No model.) Patented in England November 26, 1887, No. 16,270.

*To all whom it may concern:*

Be it known that I, HENRY HUTCHINSON, a subject of the Queen of Great Britain and Ireland, residing at Cannon Street, in the city of London, Kingdom of Great Britain and Ireland, have invented Improvements in Furnaces for Calcining Ores, (for which I have received British patent, No. 16,270, dated November 26, 1887,) of which the following is a specification.

This invention relates to improvements in furnaces for calcining or roasting ores and other substances, and is specially adapted for the dry treatment of refractory gold and silver ores, for the purpose of rendering the same capable of being successfully treated by wet methods for the extraction of the gold or silver, or both, contained therein.

Hitherto it has been found impossible to successfully treat what are known as "rebellious" or "refractory" (hereinafter called "refractory") gold and silver bearing ores by wet or hydro-metallurgical methods when the gold or silver, or both, have been associated or combined with sulphur, arsenic, antimony, or tellurium, and long practical experience has proved that in preparing such refractory gold and silver ores for their successful subsequent treatment by the methods now in use—such as amalgamation and chlorination—a preliminary roasting or calcination is necessary to free such ores from the before-mentioned elements.

In a furnace constructed according to this invention the calcination or roasting of the ore or other substance (hereinafter referred to as "ore") is effected in a more successful manner than heretofore, and so that ores of the kind mentioned can be successfully treated for the extraction of the gold and silver therein by subjecting it while in a finely-divided and suspended condition to the oxidizing action of a blast or blasts of highly-heated air mixed or not with steam or water vapor.

My improved furnace is connected with a gas-generator of any suitable construction, and comprises a vertical heating-chamber in which is or are placed one or more tubes or conduits or sets or series of tubes or conduits of suitable refractory material—such as iron, earthenware, or fire-clay—around which the burning generator-gas mixed with air is caused to pass, and through which a current of air is caused to flow in a highly-heated state into a vertical calcining-chamber, which may be called the "calcining," "oxidizing," or "chloridizing" zone of the furnace, but, for brevity, is hereinafter referred to as the "calcining-chamber." This calcining-chamber is provided with baffle plates or shelves, onto which the ore while being calcined successively falls on its way to a dust or settling or ore chamber, (hereinafter called the "settling-chamber,") and which is constructed with divisions or walls to stop or baffle the floating particles of calcined or chloridized ore. A suitable damper or dampers is or are provided for the purpose of closing the flue leading to the chimney and causing the current of heated gases and products of combustion to pass over the top of the settling-chamber and through a suitably-constructed flue, over which is placed a drying-floor constructed of suitable material—such as iron plates—and which serves for drying the pulverized ore or the salt required in carrying out the calcining or roasting operation. Suitable valves or dampers arranged in the gas-flues leading from the gas-generator may be used when necessary for causing the combustible gas to pass direct from the gas-generator to the flue beneath the drying-floor, where it is mixed with air for its combustion. By the construction described the contents of the settling-chamber may be removed through suitably-arranged openings in the floor of the chamber without stopping or interfering with the combustion of the gases under the drying-floor or with the exit of the products of combustion to the chimney. Free access may thus be obtained to the settling-chamber without interfering with the drying operations.

In the accompanying two sheets of illustrative drawings, Figure 1 is a longitudinal vertical section of a calcining-furnace constructed according to this invention. Figs. 2 and 3 are sectional detail views illustrating a modified construction of part of the furnace.

Referring to Fig. 1, A is a gas-port in communication with a gas main or flue leading from a gas-generator of any suitable construction, and B B are ports for admitting air to effect the combustion of the gas. These gas and air ports are formed in the lower part of a vertical heating-chamber C, in which is arranged a series of refractory air-heating tubes or conduits D, through which air is caused to pass from an air-inlet port E and air-chamber E' to the calcining-chamber F. The air-tubes are heated externally by the combustion of the generator-gas in the heating-chamber C, through the opposite walls of which the said tubes pass. As will be obvious, the heating-chamber C may surround the chamber F and be traversed by a series of tubes—such as D—arranged to deliver streams of hot air on each side of said chamber F. The chamber F is provided with a series of baffle-plates or inclined shelves G. These plates cause the ore treated to fall in a zigzag course through the calcining-chamber.

H is a hopper through which the dried finely-pulverized ore is fed to the said calcining-chamber.

I is a tube through which pulverized ore may be blown by a steam or other suitable blower I' into the calcining-chamber direct from a pulverizer or grinding apparatus $I^2$ without being subsequently handled.

J J are poking-holes through which bars may be inserted for stirring up the ore when necessary to prevent lodgment thereof.

K is a tube, through which finely-divided common salt may be blown or delivered to the lower part of the calcining-chamber. When the ore treated is to be chloridized, the salt is introduced in such a manner as to meet the descending shower of partly desulphurized and sulphated ore.

L L are blast pipes or blowers for the introduction of additional air to the chambers C and E'.

M is an opening for the direct passage of gas from the heating-chamber C to the lower part of the calcining-chamber F, and thence to the settling-chamber F'. It is normally closed by a sliding damper M', that may be drawn out when it is desired to heat the floor of the settling-chamber F' direct, or when this chamber is to be used as a calcining-chamber.

N N are openings in the side of the settling-chamber. They are normally closed by doors.

O O are discharging-holes in the floor of the said chamber.

P is a flue located below the settling-chamber and leading from another furnace A', that may be used for heating the floor of the settling-chamber to assist calcination operations therein when desired.

Q is a damper for controlling a passage between the settling-chamber and a flue R, that passes beneath a drying-floor S and is in communication with a chimney. By means of the damper Q and flue R the waste heated gases and products of combustion may be utilized for drying ore and other substances placed on the drying-floor.

W W' are divisions or walls which divide the chamber into a series of compartments. They may be made of considerable thickness and constructed in such a manner that when heated by the products of combustion and heated ore they will act as reservoirs of heat to equalize the temperature of the said chamber after the manner of the brick-work in regenerative stoves. The divisions or walls W W extend downward from the top of the settling-chamber, and the divisions or walls W' W' extend upward from the floor thereof. These walls cause the hot gases and products of combustion to pass in a zigzag direction through the settling-chamber on their way to the chimney, and thus facilitate the precipitation of any particles of powdered ore that may be carried forward by the force of the draft. The walls W' may be provided with air ways and ports for the admission of air to the settling-chamber, as shown at $W^2$, or with pipes that may be embedded within the walls, as indicated at V V. Through such pipes air or steam for use in the calcining-chamber F may be passed and the heat of the walls utilized for heating the same.

X is a sight-hole that may be normally closed by a plug, as shown, and Y is a valve for controlling the communication between the settling-chamber and the flue T' leading to the chimney.

In Figs. 2 and 3 the air-heating and combustion chamber C, in lieu of containing tubes D, as in Fig. 1, contains a number of vertical fire-brick walls or divisions D*, of refractory material, arranged at a short distance apart, as shown, to form a series of vertical passages, through which a supply of air passes in addition to the combustible mixture of air and gas supplied through the gas-main A and airways B, respectively.

D' is a blast-pipe for the introduction of the additional supply of air to the chamber C, for use in the calcining-chamber F, the sides of which are formed with inclined surfaces or ledges G.

N is an opening normally closed by a door.

G' is a flue communicating with the settling-chamber, and H is a charging-hopper, as before.

H' is a distributer fixed below the hopper-opening for distributing the ore to the calcining-chamber. In Fig. 1 this distributer is of cylindrical form, and in Fig. 2 it is of wedge form.

The operation of the furnace is as follows: The calcining-chamber is first heated to a suitable temperature by the combustion of the generator-gas, and then the ore to be treated (containing sulphur, arsenic, antimony, or tellurium) is introduced therein through the hopper H in a finely-pulverized and dried condition. The ore in its descent through the calcining-chamber is constantly subjected to a current of highly-heated air and generator-gas, which have the effect of completely expelling the said rebellious elements from the ore, the zigzag motion imparted to the ore by the baffle-plates G aiding the operation by retarding the rate of descent and distributing the ore so that the whole of it may be well acted upon by the heated air. The calcined ore passes to the settling-chamber, where it may be submitted to a further heating operation in the presence of the escaping gases and excess of air, and in those cases where common salt (NaCl) is introduced through the pipe K for chloridizing the ore it will be further subjected to the action of hydrochloric acid and chlorine produced by the decomposition of the salt. The calcined ore may then be withdrawn through the opening or openings O, and, if necessary, allowed to cool before being further treated. The ore will then be found to be in a suitable condition for further treatment by amalgamation, chlorination, bromination, by solution of hyposulphites, or by other well-known processes for the extraction of the gold or silver, or both, contained therein.

Furnaces constructed according to this invention may be used for roasting or calcining substances other than refractory gold and silver bearing ores. Thus they may be used for roasting or calcining materials used in the manufacture of cement.

What I claim is—

1. In a calcining-furnace, the combination of a vertical calcining-chamber, a vertical heating-chamber communicating at its upper end with the upper part of said calcining-chamber, gas and air inlet ports arranged at the lower end of said heating-chamber, and air-conduits located in said air-heating chamber and arranged to deliver heated air to said calcining-chamber, substantially as herein described.

2. In a calcining-furnace, the combination of a vertical calcining-chamber, a vertical heating-chamber communicating at its upper end with the upper part of said calcining-chamber, gas and air inlet ports arranged at the lower end of said heating-chamber, a vertical air-chamber, and a series of air-conduits arranged to traverse said heating-chamber, so as to be heated by the combustion of gaseous fuel therein, and each in communication at one end with said air-chamber and at the other end with the interior of said calcining-chamber, substantially as herein described, for the purposes set forth.

3. In a calcining-furnace, the combination of a vertical calcining-chamber provided with a series of inclined surfaces or shelves, a vertical heating-chamber communicating at its upper end only with said calcining-chamber, gas and air inlet ports located at the lower part of said heating-chamber, a series of air-conduits traversing said heating-chamber and each in communication at one end with said calcining-chamber and at the other with an air-supply, and an inlet for ore or other substance, located at the upper part of said calcining-chamber, substantially as herein described, for the purposes set forth.

4. In a calcining-furnace, the combination of a vertical calcining-chamber provided with a series of inclined surfaces or shelves, a vertical heating-chamber connected at its upper part with the upper part of said calcining-chamber, gas and air inlet ports located at the lower part of said heating-chamber, a series of air-conduits traversing said heating-chamber and in communication with said calcining-chamber, and a settling-chamber in communication with the lower end of said calcining-chamber, substantially as herein described, for the purposes set forth.

5. In a calcining-furnace, the combination of a vertical calcining-chamber, an air-heating chamber in communication with the upper end of said calcining-chamber, a settling-chamber in communication with the lower end of said calcining-chamber, a flue located above and arranged to be placed in communication with said settling-chamber, a valve or door for controlling the communication between said flue and settling-chamber, and a drying-floor located above said flue, substantially as hereinabove described, for the purposes set forth.

6. In a calcining-furnace, the combination of a calcining-chamber, an air-heating chamber in communication with the upper end thereof, a settling-chamber in communication with the lower end of said calcining-chamber, a flue located below the floor of said settling-chamber, and a combustion-chamber in communication with said flue, for the purpose set forth.

7. In a calcining-furnace, the combination of a vertical calcining-chamber having an inlet at its upper part for material to be treated, a heating-chamber in communication with the upper end of said calcining-chamber, gas and air inlet ports at the lower end of said heating-chamber, air-conduits traversing said heating-chamber and arranged to deliver heated air into said calcining-chamber, a settling-chamber in communication with the lower part of said calcining-chamber, a passage connecting the lower part of said calcining-chamber with said heating-chamber, and a valve or damper for controlling said passage, substantially as herein described, for the purpose set forth.

8. In a calcining-furnace, the combination of a vertical calcining-chamber provided with a series of inclined surfaces or shelves and with an inlet at its upper part for material to be treated, a vertical heating-chamber communicating at its upper end with said calcining-chamber, inlet-ports arranged to deliver air and combustible gas into the lower part of said heating-chamber, a series of air-conduits traversing said heating-chamber and communicating with said calcining-chamber, and a pipe or passage arranged at the lower part of said calcining-chamber for the introduction of common salt to the lower part of said calcining-chamber.

9. In a calcining-furnace, the combination of a vertical calcining-chamber provided with a series of inclined surfaces or shelves and with an inlet at its upper part for material to be treated, a vertical heating-chamber in free communication at its upper end with the upper end of said calcining-chamber, a passage located between the lower ends of said calcining and heating chambers, a valve that normally closes said passage, a series of horizontal air-conduits traversing said heating-chamber and each in communication at one end with an air-chamber and at the other end with the calcining-chamber, ports for admission of air and combustible gas to the lower end of said heating-chamber, a settling-chamber in communication with the lower end of said calcining-chamber, and provided with walls or divisions extending alternately from the floor and roof of said settling-chamber, a flue located above said settling-chamber and arranged to be placed in communication therewith, a valve for controlling said communication, a drying-floor located above said flue, a lower flue located below said settling-chamber, and a combustion-chamber in communication with said lower flue, all substantially as herein described, for the purposes specified.

In testimony whereof I have signed my name to this specification in the presence of two subscribing witnesses.

HENRY HUTCHINSON.

Witnesses:
   F. J. BROUGHAM,
   W. CROSS,
*Both of 46 Lincoln's Inn Fields, London.*